3,264,298
QUINACRIDONE PIGMENTS

William L. Berry, Somerville, and James J. Kelly, Bridgewater Township, Somerset County, N.J., assignors to American Cyanamid Company, New York, N.Y., a corporation of Maine
No Drawing. Filed Feb. 26, 1962, Ser. No. 175,816
2 Claims. (Cl. 260—279)

This invention relates to improved linear 2,9-dimethylquinacridone pigments in two distinct crystalline forms, said pigments both being chemically characterized as 2,9-dimethylquinacridone represented by the following formula:

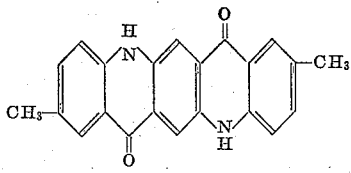

While 2,9-dimethylquinacridone has been known as a crude solid material, in this form it was relatively useless for pigmentary uses. When formulation of the known crude material into coating compositions was attempted, it was found that commercially inferior products were obtained. They were light sensitive, heat sensitive and solvent-unstable. In view of the potentially desirable color of 2,9-dimethylquinacridone, it was an object of this invention to prepare products which were without the aforementioned disadvantages.

The present invention is based on the discovery that 2,9-dimethylquinacridone can be obtained in two substantially pure and distinct crystalline forms, each of which has excellent color and shade qualities making it suitable for normal pigmentary applications.

The crystalline forms have different physical properties by which they may be distinguished. One such difference is the shade of the visual red color of each. One has a blue shade and will hereinafter be referred to as the blue shade pigment, and the other has a *yellower* shade and will be referred to as the yellow shade pigment. That the two forms are in fact distinct is readily shown upon examination by the X-ray powder diffraction technique. By this method the powdered crystals are irradiated with CuK alpha X-rays and the diffracted rays measured both as to intensity and angle with a Geiger counter. The angle of diffraction is converted for convenience to interplanar spacings expressed in angstrom units and the intensity is expressed as a percentage of the intensity of the strongest line (set at 100%). By this procedure the following values were obtained for the yellow and blue shade pigments of this invention.

| Yellow Shade Form | | Blue Shade Form | |
|---|---|---|---|
| Interplanar Spacings (A.) | Intensity (percent) | Interplanar Spacings (A.) | Intensity (percent) |
| 16.0 | (100) | 17.2 | (100) |
| 3.35 | 67 | 3.34 | 73 |
| 6.43 | 55 | 6.39 | 53 |
| 3.51 | 21 | 8.3 | 30 |
| 8.0 | 24 | | |
| 3.74 | 17 | | |
| 3.97 | 14 | | |

It will be recognized that the blue shade pigment shows a diffraction pattern with a line of maximum intensity corresponding to an interplanar spacing of 17.2 A., a second most intense line corresponding to a spacing of 3.34 A. and a third most intense line corresponding to a spacing of 6.39 A. with a line of minor intensity corresponding to a spacing of 8.3 A. The yellow shade pigment, on the other hand, shows a diffraction pattern with a line of maximum intensity corresponding to an interplanar spacing of 16.0 A., a second most intense line at a spacing of 3.35 A. and a third most intense line at a spacing of 6.43 A. with lines of minor intensity corresponding to 3.51, 8.0, 3.74 and 3.97 A.

In preparing the 2,9-dimethylquinacridone crystalline forms of the present invention several methods may be used. One convenient method involves the preparation of a dialkyl succinyl succinate by condensation of two moles of diethyl succinate. The dialkyl succinyl succinate is condensed with two moles of p-toluidine to give a dialkyl-2,5-di-p-toluidino-3,6-dihydroterephthalic acid ester which may be converted to 2,9-dimethylquinacridone by oxidation and ring closure, either concurrently or in any sequence. Oxidation is most conveniently accomplished by heating in a liquid medium and passing in a stream of hot air. Ring closure may be accomplished by known methods. For example, the terephthalate derivative may be heated in the presence of boric acid, zinc chloride, polyphosphoric acid, phosphorous pentachloride or sulfuric acid. Thus, when the dialkyl ester of 2,5-di-p-toluidino-terephthalic acid is heated in polyphosphoric acid, the blue shade pigment form is obtained. This form may be conditioned for final use as a pigment by methods conventionally known to the art. These normally comprise grinding or milling in either a ball mill, roller mill or runner mill or any other mill which grinds by attrition or shearing. The grinding may be conducted in the presence of a non-polar organic solvent and is continued until the desired particle size is obtained. Optimum times are not critical and can easily be determined by experimentation. The blue shade powder thus obtained is suitable for conventional pigmentary uses.

The yellow shade crystalline form can be obtained from the blue shade crystalline form either before or after the latter is conditioned. This may be accomplished by subjecting the latter to elevated temperature conditions. The conversion is most conveniently effected by adding either crude or conditioned blue shade crystalline material to a vessel containing sufficient organic solvent, e.g., dimethylformamide, methanol, ethanol or any other lower alkanol, dimethyl sulfoxide, xylene, etc., and heating the mixture at a reflux temperature for a period of 2 to 72 hours or more. The filtered yellow shade form may be further conditioned by grinding as with salt in accordance with the aforementioned grinding procedures.

The chemical reactions which are involved in the foregoing prepartions may be generally represented by the following flow sheet in which each radical "R" is individually hydrogen or a lower alkyl (e.g., methyl and ethyl):

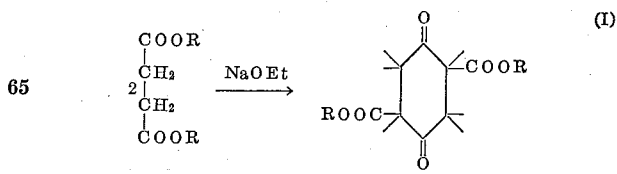
(I)

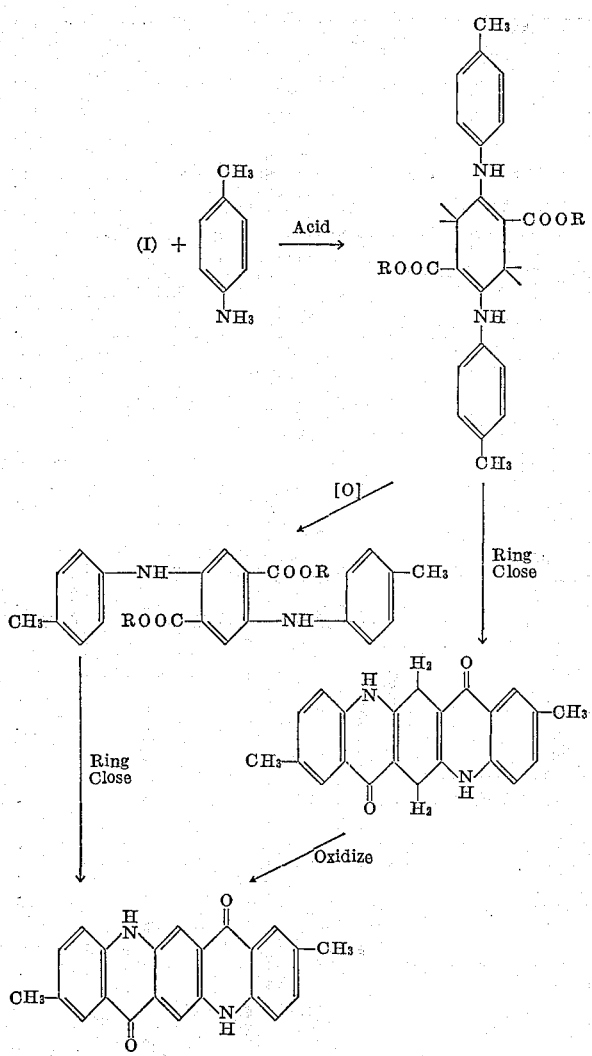

The 2,9-dimethylquinacridone pigments of the present invention are surprisingly stable under conditions of high temperature. This is especially true of the yellow shade crystalline form. The crystalline pigments of the present invention also show excellent stability in the presence of solvents and are extremely lightfast.

The new pigments of the present invention may be used by methods conventionally known in the pigment art. Thus, they may be conditioned as by salt grinding with various grinding aids and various vehicles or they may be acid pasted. When conditioned, they are especially useful for blending with other pigments even inorganic pigments to produce pigments of a wide range of shades.

The present invention is further illustrated by the following examples.

Example 1

A slurry of 1470 g. of powdered sodium ethylate and 1820 g. of diethyl succinate in 6000 cc. of xylene is prepared. This slurry is heated to 110° C. over a one hour period. The mixture thickens and after cooling to room temperature, approximately 2400 g. of acetic acid (temperature rises spontaneously to about 70° C.) and 1060 g. of p-toluidine are added. Preheated air is passed into the reaction mixture during a heating period of 8 to 9 hours at about 120 to 130° C., in the meantime removing alcohol distillate, etc.

The xylene is then removed by steam distillation and the solid material which remains is slurried in water and the alcohol several times and finally washed with alcohol giving the ester in the form of a red solid with a melting point of approximately 184° C.

Example 2

To 500 g. of commercial polyphosphoric acid is added 26.2 g. of the diethyl ester of 2,5-di-p-toluidinoterephthalic acid and the mixture is heated at 150 to 160° C. for about one hour. The reaction mixture is then drowned into two liters of hot water containing about 17 g. of xylene. This is boiled for a short period and the solid material is then removed by filtration and slurried in very dilute alkaline solution. After final filtration and washing, a crude red colored product is obtained.

This is then conditioned by salt grinding in a ball mill with fine flaked salt in the presence of xylene. For this purpose a mixture of 13 g. of the crude 2,9-dimethyl-quinacridone perpared above, 234 g. of extra fine flaked salt and 3 ml. of xylene is milled in a ball mill a sufficient period (4 days). The mixture is then slurried in one liter of 5% sulfuric acid and after heating to the boiling point, the solid material is removed by hot filtration and thoroughly washed with water. This procedure gives the blue shade crystal form of 2,9-dimethylquinacridone.

Example 3

To 500 ml. of dimethyl formamide is added 20 g. of the 2,9-dimethylquinacridone prepared as described in Example 2 (before any conditioning). The mixture is heated at the reflux temperature and after isolating by filtration and washing with dimethyl formamide the material which is now in the yellow shade form is conditioned by salt grinding in a dough mixer with salt in dimethyl formamide as a vehicle. For this purpose, the 2,9-dimethylquinacridone from above, after heating in dimethyl formamide, is added to 260 g. of micro atomized salt, 100 g. of extra fine flaked salt and 40 ml. of dimethyl formamide. This mixture is conditioned in the dough mixer for a sufficient period (7 hours). The product is then slurried in three liters of water, acidified with dilute sulfuric acid and after heating and filtration, isolated as the yellow shade pigment product.

Alternatively, a superior product is obtained when about 5 g. of blue shade pigment of Example 2 is ball milled for 48 hours in an eight ounce mill containing about 600 g. ⅛" steel balls, and about 100 ml. of a 2:1 xylene-butanol mixture.

We claim:
1. The compound 2,9-dimethylquinacridone in a crystalline form characterized by being colored a yellow shade of red and having an X-ray diffraction pattern with a line of maximum intensity corresponding to an interplanar spacing of 16.0 A., a second most intense line corresponding to a spacing of 3.35 A. and a third most intense line corresponding to a spacing of 6.43 A. with lines of minor intensity corresponding to 3.51, 8.0, 3.74 and 7.97 A.

2. A yellow shade 2,9-dimethylquinacridone pigment consisting of individual pigmentary sized particles of 2,9-dimethylquinacridone, the individual particles having such crystalline characteristics that they are characterized by the pigment being a yellow shade of red and having an X-ray diffraction pattern with the line of maximum intensity corresponding to an interplanar space of 16.0 A., a second most intense line corresponding to a spacing of 3.35 A, and a third most intense line corresponding to a spacing of 6.43 A. with lines of minor intensity corresponding to 3.51, 8.0, 3.74 and 3.97 A.

References Cited by the Examiner

UNITED STATES PATENTS 3,009,916  11/1961  Struve _____ 260—279

(Other references on following page)

UNITED STATES PATENTS

| | | | |
|---|---|---|---|
| 3,020,279 | 2/1962 | Woodlock et al. | 260—279 |
| 3,030,370 | 4/1962 | Jackson | 260—279 |

FOREIGN PATENTS

| | | |
|---|---|---|
| 1,226,260 | 2/1960 | France. |
| 1,244,061 | 9/1960 | France. |
| 828,052 | 2/1960 | Great Britain. |

HENRY R. JILES, *Acting Primary Examiner.*

D. M. McCUTCHEN, NICHOLAS S. RIZZO,
*Examiners.*

D. M. KERR, DONALD A. DAUS,
*Assistant Examiners.*

UNITED STATES PATENT OFFICE
CERTIFICATE OF CORRECTION

Patent No. 3,264,298                           August 2, 1966

William L. Berry et al.

It is hereby certified that error appears in the above numbered patent requiring correction and that the said Letters Patent should read as corrected below.

Column 2, line 57, for "prepartions" read -- preparations --;
column 3, lines 6 to 14, the formula should appear as shown below instead of as in the patent:

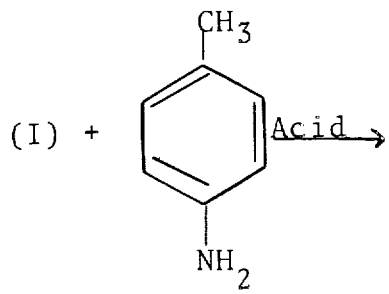

column 4, line 58, for "7.97 A" read -- 3.97 A --.

Signed and sealed this 22nd day of August 1967.

(SEAL)
Attest:

ERNEST W. SWIDER                               EDWARD J. BRENNER
Attesting Officer                              Commissioner of Patents